June 22, 1926. 1,589,658
R. P. PESCARA
HELICOPLANE SUPPORTING SYSTEM
Filed Dec. 29, 1921
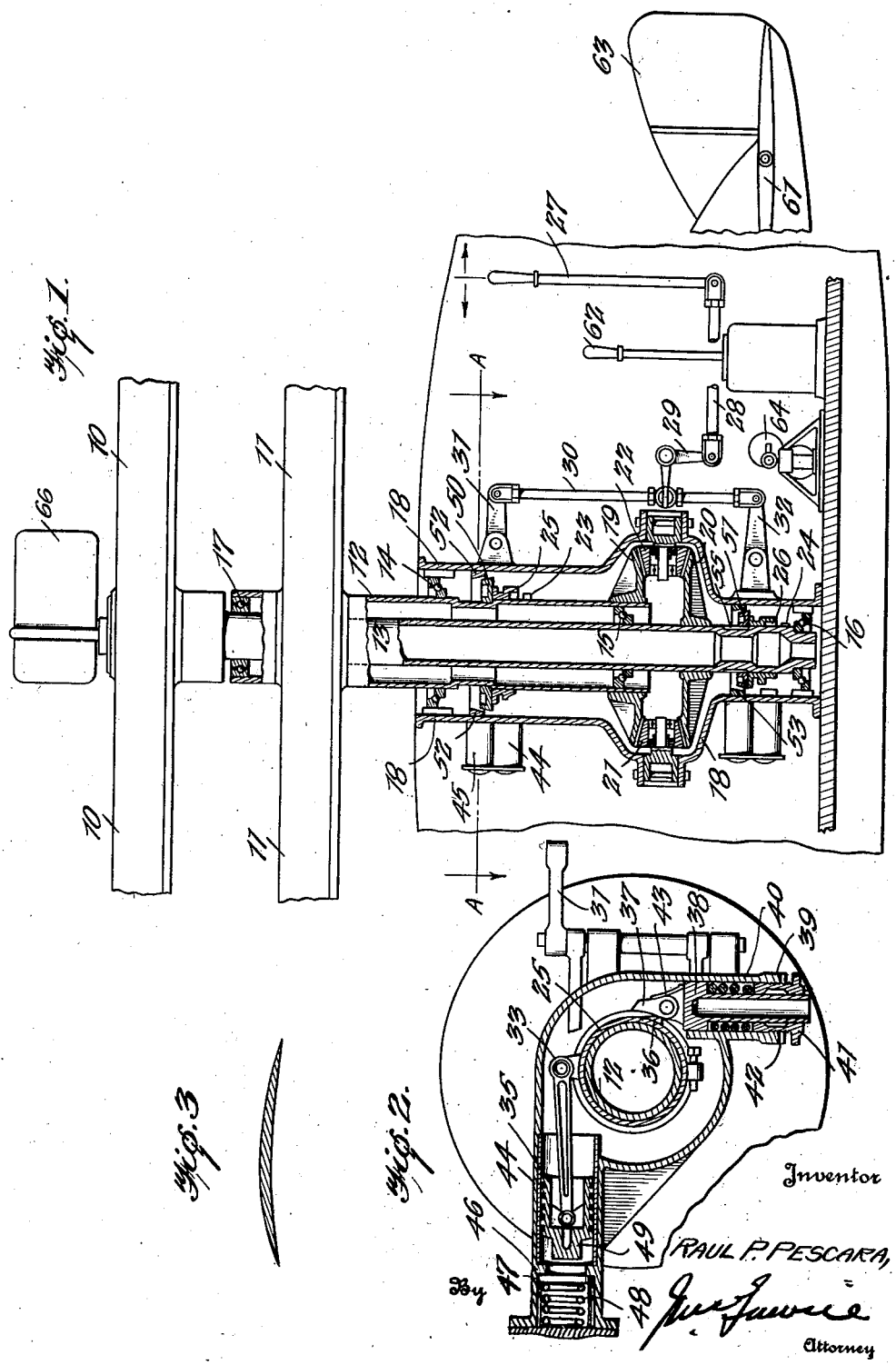

Patented June 22, 1926.

1,589,658

UNITED STATES PATENT OFFICE.

RAUL PATERAS PESCARA, OF BARCELONA, SPAIN.

HELICOPLANE-SUPPORTING SYSTEM.

Application filed December 29, 1921, Serial No. 525,734, and in Spain December 3, 1920.

The invention relates to an improvement in aeroplanes, wherein provision is made for providing a supporting surface capable of being fixed with respect to the aeroplane or capable of self-rotation.

In the drawings:

Fig. 1 is a broken sectional view partly in elevation, showing the improvement.

Fig. 2 is a horizontal section on the line A—A of Fig. 1.

Fig. 3 is a transverse section of one of the planes.

The supporting planes 10 and 11 are mounted on hubs 12 and 13 respectively and having ball bearing supports indicated at 14, 15, 16 and 17, with a casing 18 secured to the car. These hubs have a drive including gears 19 and 20 and pinions 21 and 22, with the axis of rotation of the latter integral with the casing 18. The supporting surfaces 10 and 11 are thus caused to rotate in opposite directions when driven. Means are provided whereby these planes 10 and 11 may be held against rotation at will, which means is more particularly illustrated in Fig. 2. The hubs 12 and 13 have keys 23, 24, which are adapted to seat in annular grooves of sleeves 25 and 26. The hubs 12 and 13 are provided above and in contact with the sleeves with conical pieces 50, 51, having sliding cooperation with the hubs by means of keys 54 and 55. The casing 18 is interiorly provided with cones 52, 53, for frictional cooperation with the conical outer surfaces of the pieces 50, 51, so that when the sleeves 25 and 26 are moved upwardly, the frictional bearing between these parts can be secured to act as a brake on the rotating hub. The sleeves are operated by lever 27 and interconnecting mechanism comprising parts 28, 29, 30, 31, and 32, so that on operation of lever 27, the respective sleeves are moved upwardly causing the frictional engagement between the conical parts 50 and 51 and the cones 52 and 53.

Sleeve 25 is provided with a lug 33 (Fig. 2) to which is pivoted a connecting rod 34, which is fixed at the opposite end to a piston 35. The sleeve 25 is also provided with a pawl 36, which is adapted to engage a pawl 37 connected to a piston 38 movable in a cylinder 39 secured to the casing 18. A spring 40 held in place by cap 41 serves to push the piston 38 into contact with an adjustable stop 42. A spring 43 holds the pawl 37 in a position to be engaged by the pawl 36.

The piston 35 operates in a cylinder 44 containing oil, which cylinder 44 communicates with a second cylinder 45 containing air under pressure.

After the operation of the lever 27 and the corresponding braking of the hubs, the lever is turned in the opposite direction, indicated by the arrow 56, and the sleeve 25 descends so as to cause the teeth on the sleeve 25 to contact with the tooth or projection 23. The sleeve is then rigidly connected to the shaft and the rotary motion of the shaft is gradually checked as a result of the increased resistance due to the resultant movement of piston 35. The piston 35 is checked through the pressure necessary to force the oil into the upper cylinder 45 and practically at the point where the piston 35, or the end 49 thereof, is in contact with the partition 47, the pawl 37 drops in behind the tooth 36. If the energy of the rotating planes has been already absorbed by the movement of piston 35, the planes will of course be in position of rest. If on the other hand, the motion of the planes is not completely absorbed, the further movement of piston 35 is resisted by spring 48 in the outer end of cylinder 44, and at the same time the tooth 36 exerts a pressure against the pawl 37 to add the resisting power of the spring 40 to the movement of the plane. These springs will of course cause a slight rotary oscillation until the inertia is completely absorbed. The operation just described is of course duplicated with the sleeve 26, it being understood that the positions of the interlocking teeth or projections 23 and 24 are such that when the planes are brought to rest, their relative positions and also their positions with respect to the body of the car is that required for the work of the fixed plane aeroplane.

The lever 27 may then be returned to normal position, if desired, whereby the planes are free for self-rotation by the action of the air currents, as will be apparent. The rudder 60 acts as a lateral stabilizer, while the elevator 61 acts as a longitudinal stabilizer. The usual rudder 63 adapted to be controlled by the pedal 64 governs the turning of the machine. The stabilizing rudders are controlled by the joy stick 62. These controls however, form no part of the subject matter of the present application.

Having thus described the invention, what is claimed as new is:

An aeroplane having a pair of supporting surfaces adapted to rotate in opposite directions, shafts therefor, axially displaceable sleeves surrounding said shafts, cooperating friction devices to be brought into play in the upward displacement of the sleeves, a pawl carried by each of said sleeves, and means to cause said pawl to engage with a fixed catch on the downward displacement of the sleeve to lock the particular shaft against rotation.

In testimony that he claims the foregoing as his invention, he has signed his name.

RAUL PATERAS PESCARA.